United States Patent [19]
Gore

[11] Patent Number: 5,580,037
[45] Date of Patent: Dec. 3, 1996

[54] FOOD PREPARATION AND SERVING PLATE

[76] Inventor: Rex W. Gore, 309 Forrest Ave., Lodi, Calif. 95240

[21] Appl. No.: 253,112

[22] Filed: Jun. 2, 1994

[51] Int. Cl.$^6$ .............................. B23Q 3/00; A47G 19/02
[52] U.S. Cl. ...................... 269/57.5; D7/550; 220/574.1; 269/289 R; 269/302.1
[58] Field of Search ................................ 220/574, 574.1, 220/575; 206/565, 518; 269/289 R, 302.1, 54.5; D7/550

[56] References Cited

U.S. PATENT DOCUMENTS

| | | | |
|---|---|---|---|
| 93,844 | 8/1869 | Sykes | 269/54.5 |
| D. 187,237 | 2/1960 | Kindelberger | D44/10 |
| 704,139 | 7/1902 | Stadelman . | |
| 1,343,606 | 6/1920 | Young . | |
| 2,206,207 | 7/1940 | Taylor et al. | 269/54.5 |
| 2,257,970 | 10/1941 | Long | 65/15 |
| 2,683,974 | 7/1954 | Brown | 65/15 |
| 2,757,525 | 8/1956 | Marsala | 220/574 |
| 2,940,634 | 6/1960 | Wild | 220/85 |
| 3,598,278 | 8/1971 | Vann, Jr. | 220/85 |
| 3,847,324 | 11/1974 | Uchanski et al. | 220/574 X |
| 4,140,340 | 2/1979 | Cloutier | 269/295 |
| 4,218,167 | 8/1980 | Mansfield | 414/09 |
| 4,284,681 | 8/1981 | Tidmarsh | 428/246 |
| 4,930,759 | 6/1990 | Potter et al. | 269/289 RX |
| 4,986,434 | 1/1991 | Prestyly, Jr. | 220/83 |

FOREIGN PATENT DOCUMENTS 480612 9/1916 France .................................. 220/574

Primary Examiner—Allan N. Shoap
Assistant Examiner—Niki M. Kopsidas
Attorney, Agent, or Firm—Bernhard Kreten

[57] ABSTRACT

A food preparation and serving plate (10) is provided which assists a disabled user in preparing and consuming food items placed thereon. The plate (10) includes a planar top surface (20) surrounded by a sidewall (50). A bottom surface (30) parallel to and beneath the top surface (20) includes a non-slip pad (40) thereon to secure the plate (10) to an underlying support surface. The sidewall (50) includes an overhang (60) on a portion of the sidewall (50) which includes a lip (62) which assists the user in loading a utensil, such as a spoon (S), with small food items. The top surface (20) includes a fulcrum (70) spaced above the top surface (20). The fulcrum (70) is utilized along with a knife ($K_1$) to provide leverage in cleaving food items into bite-sized morsels. A tip (T) of the knife ($K_1$) is placed under the fulcrum (70) and then a handle (H) of the knife ($K_1$) is forced downward with a blade ($B_1$) of the knife ($K_1$) between the handle (H) and the tip (T) driving into the food item. Spikes (80) are provided extending upward from the top surface (20) of the plate (10) to support large food items from sliding upon the top surface (20) during cutting with a serrated knife ($K_2$).

18 Claims, 3 Drawing Sheets

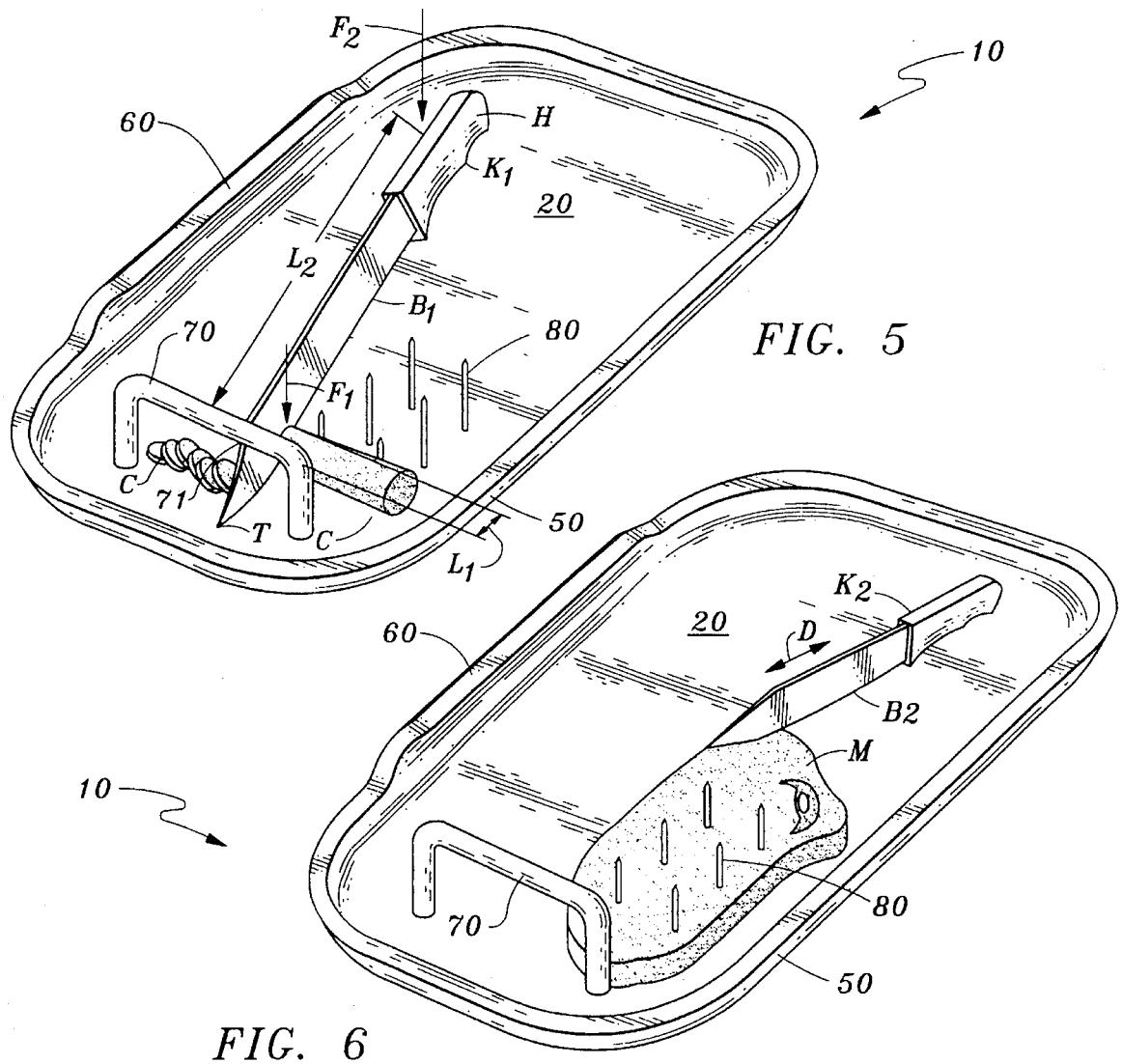
FIG. 5
FIG. 6
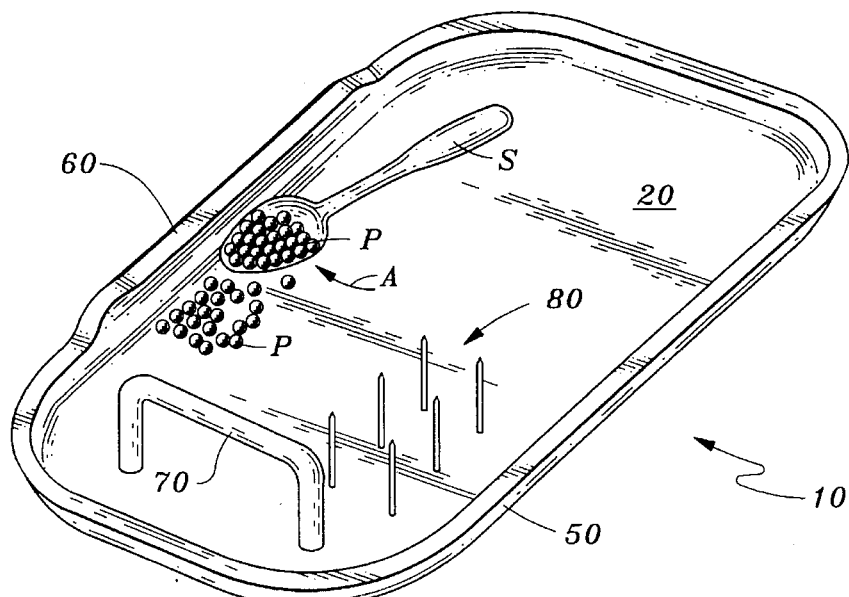
FIG. 7

FOOD PREPARATION AND SERVING PLATE

FIELD OF THE INVENTION

The following invention relates to dishware for preparing and serving food items. More specifically, this invention relates to food preparing and serving plates which address the needs of disabled users by providing structures thereon which assist in loading food onto utensils, structures to prevent food slippage upon the plate and leverage structures to assist in cleaving food items located upon the plate.

BACKGROUND OF THE INVENTION

People with disabilities in hand and/or arm motion or with the use of only one hand are presented with numerous difficulties in performing ordinary, daily activities. One area of particular difficulty for disabled people is in the preparation and consumption of their daily meals. Ordinary utensils such as knives, forks, spoons and plates require a minimum level of strength and dexterity to effectively be used. Without the requisite dexterity, spillage and other frustrations are commonly encountered. Even if the plate and food items can be kept from sliding, many disabled persons lack the requisite strength to effectively cut the food items.

While a disabled person may be assisted by others or may choose food items which are already configured in bite-sized morsels, these choices may decrease the independence of the disabled person and limit the dietary variety available. Accordingly, a need exists for a food serving plate which can be readily kept from moving upon a support surface, facilitates easy loading of food items onto utensils, prevents food items from sliding upon the plate, and assists a disabled user in cutting the food items into smaller pieces.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 704,139 | July 8, 1902 | Stadelman |
| 1,343,606 | June 15, 1920 | Young |
| 2,257,970 | October 7, 1941 | Long |
| 2,683,974 | July 20, 1954 | Brown |
| Des. 187,237 | February 16, 1960 | Kindelberger |
| 2,940,634 | June 14, 1960 | Wild |
| 3,598,278 | August 10, 1971 | Vann, Jr. |
| 4,140,340 | February 20, 1979 | Cloutier |
| 4,218,167 | August 19, 1980 | Mansfield |
| 4,284,681 | August 18, 1981 | Tidmarsh |
| 4,986,434 | January 22, 1991 | Prestyly, Jr. |

The patent to Brown teaches a child's easy feeding dish which includes a removable rim to assist a child in loading a utensil with food. This invention is distinguishable from the teachings of Brown in that, inter alia, it provides an overhang integrally formed with the plate and additionally provides food securing and cutting assistance to assist a user in cutting the food.

The patent to Long teaches a tray for watermelons which includes spikes thereon for securing the watermelon to the tray. This invention is distinguishable from the teachings of Long in that, inter alia, the spikes extend up from a horizontal top surface of the plate and the plate includes a fulcrum which assists a user in cutting the food items placed upon the plate.

The other prior art listed above, but not specifically distinguished above, diverge even more starkly from this invention than do the prior art specifically distinguished above.

SUMMARY OF THE INVENTION

A food preparation and serving plate is provided which includes multiple features to assist a disabled person in preparing and consuming food items. The plate includes a top surface which is substantially planar and includes an edge at a periphery thereof which gradually transitions into a sidewall. The sidewall extends up to a rim surrounding the plate. A bottom surface is oriented beneath the top surface and parallel to the top surface for supporting the plate upon an underlying support structure.

The disabled user is assisted in cutting food items by a fulcrum including a crossbar spaced above the top surface. Often disabled persons do not have sufficient strength to adequately cut food items on a plate. The user of this plate can grasp a handle of a knife and orient a tip of the knife beneath the crossbar of the fulcrum. A food item is oriented on the plate adjacent the crossbar so that a blade of the knife is above the food item. The user then applies a force downward on the handle of the knife causing the tip of the knife to address the crossbar and the blade of the knife to be forced into the food item. The crossbar thus provides leverage for the knife, giving the user a mechanical advantage in cutting the food item.

Spikes extending up from the top surface of the plate can support the food item from slipping upon the top surface of the plate and assist in holding the food item while the food item is cut. The spikes allow the user to cut food items such as steak by moving a serrated knife in a sawing action.

A portion of the sidewall is provided with an overhang to assist a user in loading food items onto a utensil such as a spoon or fork. The user can thus effectively cut large food items into bite-sized morsels and then utilized the overhand to effectively load the bite-sized morsels onto the utensil for consumption. The bottom surface of the plate includes a non-slip pad which holds the plate securely to the underlying support structure.

OBJECTS OF THE INVENTION

Accordingly, it is an object of the present invention to provide a food serving plate which enables people with disabilities in hand or arm strength and mobility or only one hand, to enjoy a meal and to slice and otherwise prepare food without assistance.

Another object of the present invention is to provide a plate for preparation of food by a disabled person with limited use of their hands.

Another further object of the present invention is to provide a food preparation and serving plate which can be securely supported on an underlying surface so that the plate does not slip upon the underlying surface.

Another further object of the present invention is to provide a food preparation and serving plate which prevents food items upon the plate from slipping and sliding upon the plate.

Another further object of the present invention is to provide a food preparation and serving plate which includes a sidewall which prevents food items from sliding off of the plate.

Another further object of the present invention is to provide a food serving plate which assists a disabled user in loading food items onto a utensil for consumption.

Another further object of the present invention is to provide a food preparation and serving plate which is formed from low cost, hard, smooth, non-porous materials which can be easily sterilized and reused.

Another object of the present invention is to provide a food preparation and serving plate which includes a fulcrum to assist a disabled user in cutting food items located upon the plate.

Another object of the present invention is to provide a method for preparing food items upon a plate which can be practiced by a disabled user with limited hand use.

Viewed from a first vantage point, it is an object of the present invention to provide a food serving plate for securely supporting food items thereon to assist in cutting the food items and loading the food items onto utensils for eating, the plate comprising in combination: a substantially planar top surface, a fulcrum above said top surface with a space between said fulcrum and said top surface, and means to hold said fulcrum in fixed position relative to said top surface.

Viewed from a second vantage point, it is an object of the present invention to provide a food preparation plate for supporting food items during cutting and other manipulations thereof by a disabled user, comprising in combination: a planar top surface having a perimeter, a sidewall extending up from said perimeter of said top surface, a fulcrum including a crossbar spaced above said top surface, and a means to attach said fulcrum to said top surface.

Viewed from a third vantage point, it is an object of the present invention to provide a method for cutting food items and loading food items onto utensils including the steps of: providing a plate having a planar top surface, a fulcrum oriented above said top surface with a space between said fulcrum and said top surface, a plurality of spikes extending perpendicular to said top surface from a base thereof affixed to said top surface to a sharpened tip thereof distant from said top surface, a sidewall surrounding a perimeter of said top surface, a portion of said sidewall including an overhang, and a bottom surface parallel to and spaced from said top surface, said bottom surface including a means to prevent slippage of said bottom surface relative to a support structure, placing the plate on a substantially horizontal support structure, placing food items on the top surface of the plate, piercing the food items with the spikes, orienting a knife above the top surface with a tip of the knife under the fulcrum and a handle of the knife more distant from the fulcrum than the food item, and depressing the knife down toward the surface and into the food item, and cleaving the food item into multiple separate pieces.

These and other objects will be made manifest when considering the following detailed specification when taken in conjunction with the appended drawing figures.

BRIEF DESCRIPTION OF THE DRAWINGS

FIG. 5 is a perspective view of the food serving plate of this invention exhibiting use of the fulcrum of this invention in cutting a long, cylindrical food item such as a carrot.

FIG. 6 is a perspective view of the invention of this application exhibiting how the spikes are used in cutting a food item such as steak.

FIG. 7 is a perspective view of the device of this invention revealing how an overhang is utilized in loading food items onto a utensil.

DESCRIPTION OF PREFERRED EMBODIMENTS

Figure 1:
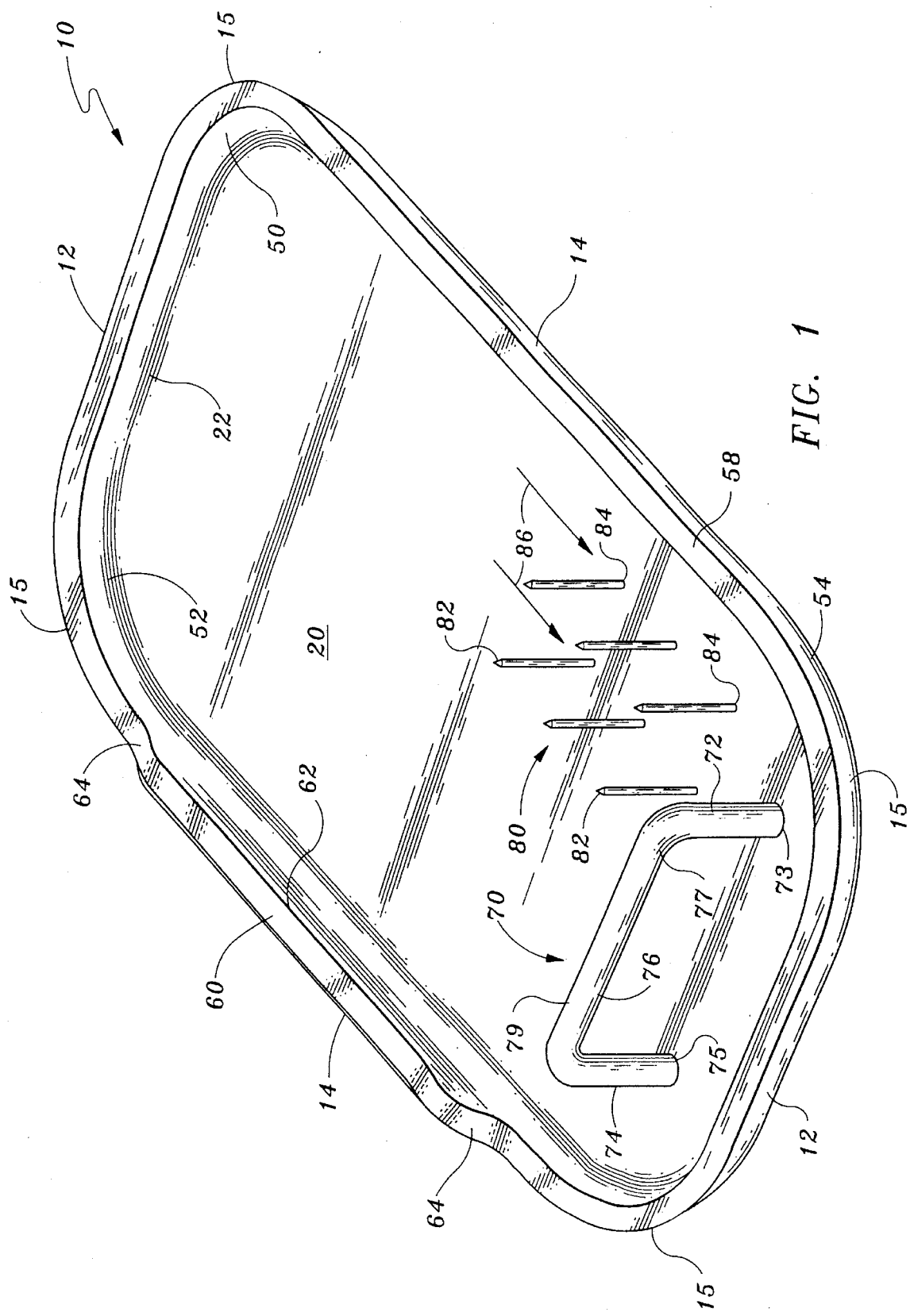
FIG. 1 is a perspective view of the food serving plate of this invention.
Figure 2:
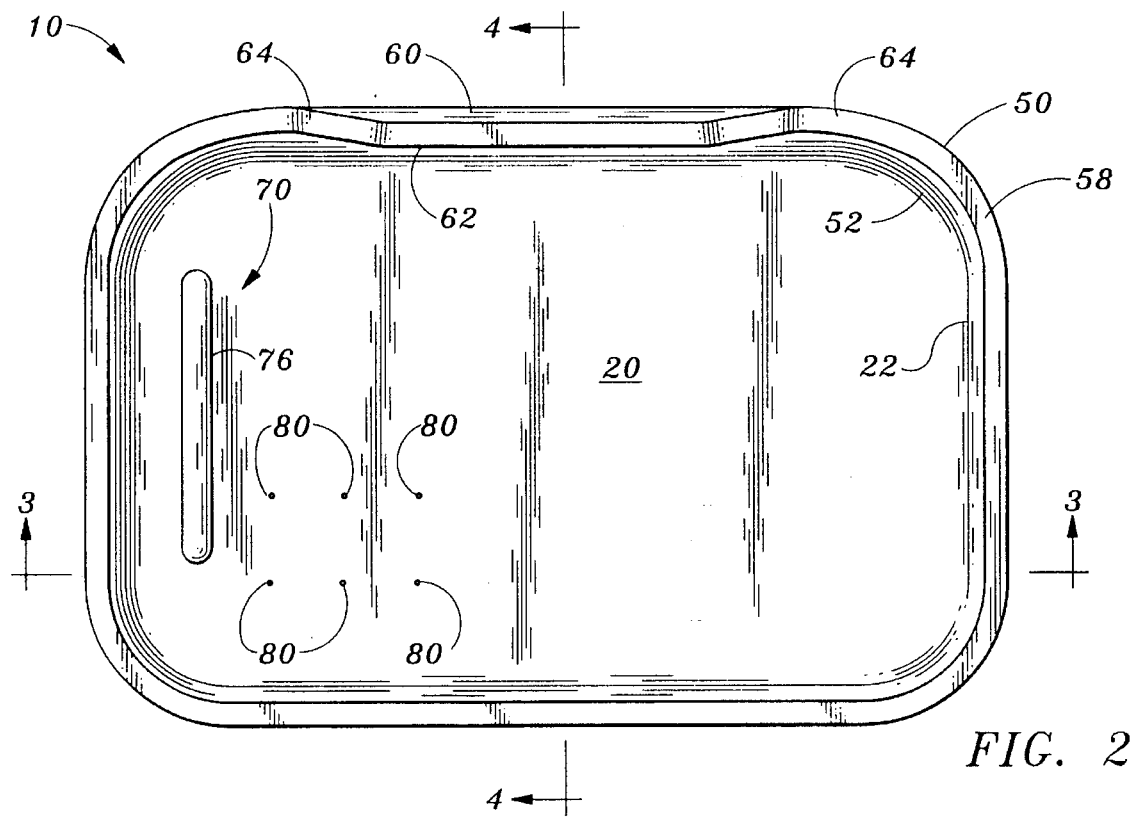
FIG. 2 is a top view of that which is shown in FIG. 1.

Referring to the drawings, wherein like reference numerals represent like parts throughout the various drawing figures, reference numeral 10 is directed to a food preparation and serving plate configured to assist a disabled user in preparing and consuming food items placed thereon.

Figure 3:
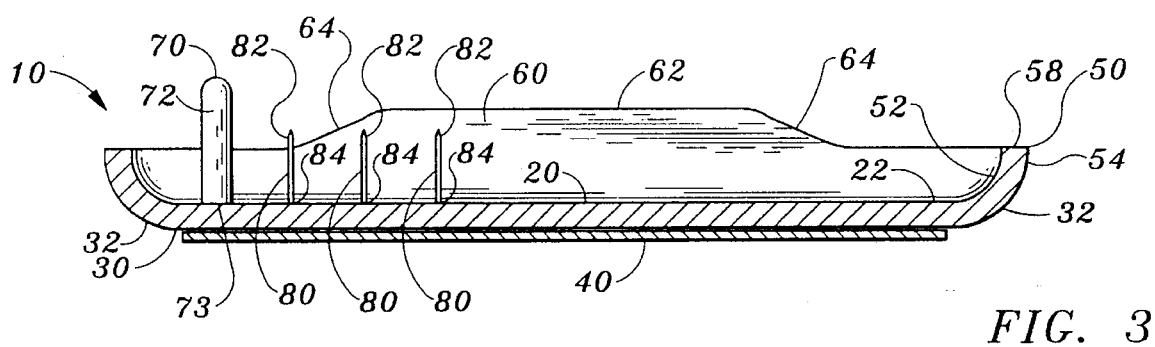
FIG. 3 is a sectional view taken along lines 3—3 of FIG. 2.
Figure 4:
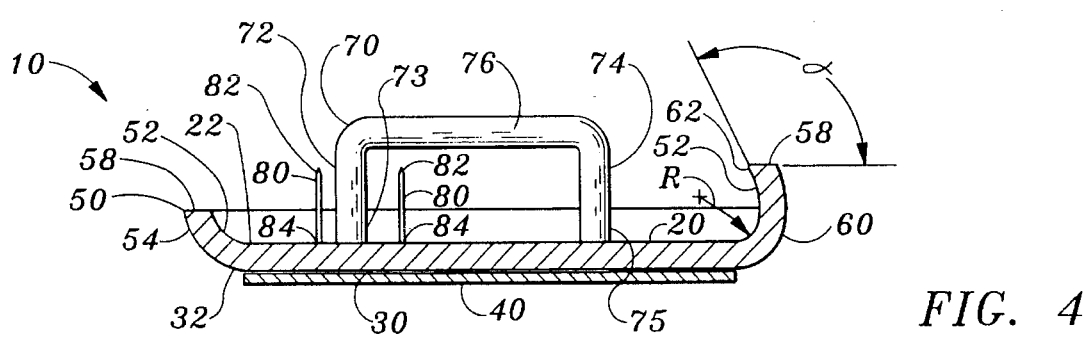
FIG. 4 is a sectional view taken along lines 4—4 of FIG. 2.

In essence, and with reference to FIG. 1, the food preparation and serving plate 10 includes a top surface 20 parallel to and spaced from a bottom surface 30 (FIG. 3) with a sidewall 50 surrounding an edge 22 of the top surface 20. A non-slip pad 40 (FIG. 3) is attached to the bottom surface 30 to prevent the plate 10 from sliding upon an underlying support surface. The sidewall 50 includes an overhang 60 on a portion thereof which assists a user in loading various utensils. A fulcrum 70 is provided extending up from the top surface 20. The fulcrum 70 assists a user in utilizing a knives $K_1$ and $K_2$ to cut food items oriented upon a top surface 20. Spikes 80 extend up from the top surface 20 and can pierce food items to support the food items securely upon the top surface 20.

More specifically, and with reference to FIGS. 1 through 4, a structure of the food preparation and serving plate 10 is described in detail. The top surface 20 is a substantially planar surface formed from a hard, smooth, non-porous, rigid material. The material of the plate 10 supporting the top surface 20 can be ceramic, plastic, or other various materials commonly utilized for dishware. The top surface 20 is preferably resistant to being cut by a knife and is sufficiently smooth and non-porous that food scraps remaining thereon can be easily removed and the plate 10 sanitized for reuse. The top surface 20 includes an edge 22 around of a periphery thereof.

The bottom surface 30 is substantially planar and parallel to a top surface 20. The bottom surface 30 is spaced below the top surface 20 by a distance sufficient to provide the plate 10 with a rigid thickness. The bottom surface 30 is circumscribed by a perimeter 32. The bottom surface 30 is similar in size and shape to the top surface 20.

A non-slip pad 40 is attached to the bottom surface 30. The non-slip pad 40 provides a means to prevent slippage of the plate 10 upon a substantially horizontal underlying support surface upon which the plate 10 can be utilized. Various types of non-slip pads 40 can be utilized, such as suction cups and high friction soft rubberized surfaces. However, the non-slip pad 40 is preferably formed from a layer of highly plasticized polyvinyl chloride which has a tacky surface and yet can be readily washed of particles adhering thereto. Such a product is the subject of U.S. Pat. No. 4,284,681 and is marketed under the trade name "Dycem". This product includes between about 15 and 45 percent polyvinyl chloride and between about 55 and 85 percent plasticizer such as polyurethane with a molecular weight of approximately 1000.

The non-slip pad 40 is preferably sized to entirely cover the entire bottom surface 30. Alternatively, strips of non-slip pad 40 material can be placed in a variety of patterns on the bottom surface 30. The non-slip pad 40 preferably is removably attached to the bottom surface 30. For instance, connectors such as snaps, hooks, buttons or clasps can be interposed between the pad 40 and the bottom surface 30 within a space therebetween.

The sidewall 50 preferably entirely surrounds the top surface 20 of the plate 10 and extends up from the top surface 20 to a rim 58. The sidewall 50 includes an inner slope 52 extending from the edge 22 of the top surface 20 to the rim 58. Preferably, the inner slope 52 gradually changes in angle from being substantially parallel to the top surface 20, adjacent the edge 22, to being substantially perpendicular to the top surface 20, adjacent the rim 58. An outer slope 54 of the sidewall 50 extends from the perimeter 32 of the bottom surface 30 up to the rim 58. Preferably, the outer slope 54 changes in angle from being substantially parallel to the bottom surface 30, adjacent the perimeter 32, to being substantially perpendicular to the bottom surface 30, adjacent the rim 58. The rim 58 is preferably substantially parallel to the top surface 20 and elevated above the top surface 20.

The sidewall 50 provides a border which assists in keeping food items in place upon the top surface 20 of the plate 10. When the food items impact the sidewall they are caused to be elevated up the inner slope 52 rather than passing off of the plate 10.

A portion of the sidewall 50 is configured so that the rim 58 extends upward to a higher elevation at an overhang 60 elevated above other portions of the rim 58. The rim 58 gradually adjusts to the elevation at the overhang 60 through transitions 64 located on either side of the overhang 60. The overhang 60 includes a lip 62 at an edge of the overhang 60 adjacent the inner slope 52 of the sidewall 60. The overhang 60 is preferably configured so that an angle $\alpha$ of the inner slope 52 is greater than 90° away from an orientation of the planar top surface 20. The overhang 60 can be utilized by a user to load small food items, such as peas P, onto a utensil such as a spoon S (see FIG. 7) as is discussed in detail hereinbelow.

The lip 62 is configured as a cornice-like projection and allows an implement, such as a spoon to "chase" food up to an underside of the cornice, forcing food into the spoon. Thus, the lip 62 projects over the top surface 20. The inner slope 52 below the lip 62 preferably has a variable radius of curvature R. The radius of curvature R preferably is shorter than a height of the sidewall 50 adjacent the edge 22 of the top surface 20 and increases as the slope 52 approaches the lip 62.

The fulcrum 70 includes a crossbar 76 supported substantially parallel to and spaced above the top surface 20. The crossbar 76 includes a first end 77 at one end thereof and a second end 79 at an opposite end thereof. The crossbar 76 extends substantially linearly between the first end 77 and the second end 79. Preferably, the crossbar 76 is substantially circular cross section.

The crossbar 76 is supported in place above the top surface 20 by a first leg 72 and a second leg 74. The first leg 72 has a foot 73 affixed to the top surface 20 and extends up to the first end 77 of the crossbar 76. The second leg 74 has a foot 75 affixed to the top surface 20 and extends up to the second end 79 of the crossbar 76. The legs 72, 74 preferably have a cross section which is substantially circular and similar in diameter to the crossbar 76. Thus, the fulcrum 70 exhibits a substantially inverted U-shaped appearance. The fulcrum 70 is preferably inboard from both the peripheral rim 58 and inboard somewhat of the edge 22 of the top surface 20. The fulcrum 70 provides one element in a lever mechanism including a knife $K_1$, and force $F_2$ applied by a user (see FIG. 5) as is discussed hereinbelow.

A plurality of spikes 80 extend upward from the top surface 20 substantially perpendicularly with respect to the top surface 20. Each spike 80 includes a base 84 adjacent the top surface 20 and a tip 82 at an end of the spike 80 distant from the base 84. The tip 82 is preferably sharpened to easily pierce a variety of food items such as carrots C and meats M (see FIGS. 5 and 6). The spikes 80 are preferably sized with a small enough diameter to pierce food items rather than splitting or smashing the food items. In this way, the spikes 80 substantially preserve a texture and consistency of the food items while securely supporting the food items upon the top surface 20 without horizontal translation.

The plate 10 preferably exhibits a substantially rectangular configuration with rounded corners 15. Thus, the plate 10 includes two short side edges 12 and two long side edges 14. Preferably, the portion of the sidewall 50 including the overhang 60 is oriented along one of the long side edges 14 which is to be placed away from the disabled user when the user is using the plate 10. Preferably, the fulcrum 70 is oriented substantially perpendicular to the long side edges 14 and substantially closer to one of the short side edges 12 than another of the shorter side edges 12. If the user is right handed, the fulcrum 70 is preferably oriented closer to a left hand side of the user. If the user is left handed, the fulcrum 70 is preferably oriented closer to a right hand side of the user.

The spikes 80 are preferably oriented in two rows 86 of three spikes 80 each, the rows 86 substantially parallel to the long side edges 14 and perpendicular to the crossbar 76 of the fulcrum 70. This spike 80 orientation allows a knife $K_1$, to pass between the rows 86 of spikes 80 and be oriented perpendicular to the crossbar 76 for most effective leverage while cutting the food items (see FIGS. 5 through 7).

The spikes 80 are preferably located closer to the long side edge 14 most distant from the overhang 60. The spikes 80 are preferably closer to the short side edge 12 having the fulcrum 70 adjacent thereto than the short side edge 12 most distant from the fulcrum 70. In this way, a large region away from the fulcrum 70 and spikes 80 is provided for foods which do not require holding with the spikes 80.

While this configuration of the plate 10 and the various elements of the plate 10 is preferred, various different configurations can be provided and the plate 10 can be utilized in different orientations with respect to the user, depending upon the particular needs of the user.

In use and operation, and with particular reference to FIGS. 5 through 7, the various uses of the food serving plate 10 are described in detail. Initially, food items to be prepared and/or served are placed upon the top surface 20 of the plate 10. Food items which might have a tendency to slide about on the top surface 20, such as potatoes or carrots C can be placed upon the spikes 80 to securely hold the food items in place. Other food items not requiring use of the spikes 80 can be placed at various locations upon the top surface 20 spaced from the spike 80. Additionally, food items which require support during cutting thereof, such as large pieces of meat M, can be supported upon the spikes 80.

When a user wishes to cut food items upon the plate 10, the food item is located slightly spaced to a side of the fulcrum 70 and with the spikes 80 optionally passing therethrough if the food item, such as a carrot C, is expected to migrate during cutting thereof. Preferably, the food item is oriented so that the knife $K_1$ is oriented substantially perpendicular to the crossbar 76 during use. Next, the knife $K_1$ is oriented with a tip T passing beneath the crossbar 76. The knife $K_1$ includes a handle H located on an opposite end of the knife $K_1$ from the tip T. A blade $B_1$, is oriented between the tip T and the handle H. The user orients the knife $K_1$ so that the blade $B_1$ is in contact with the food item at a location where cutting is desired and a handle H of the knife $K_1$ is then depressed downward by force along arrow $F_2$.

When force is applied along arrow $F_2$ in a downward direction, a portion of the blade $B_1$ of knife $K_1$ near the tip T impacts an underside of the crossbar 76. This point of contact between the blade $B_1$ and the crossbar 76 provides a pivot point 71 about which the knife $K_1$ can rotate to act as a lever during cutting of the food items.

As is known in the art, when a body is in equilibrium, the sum of all moments upon that object equal zero. Thus, for the knife $K_1$ to remain in equilibrium, a magnitude of the force $F_2$ applied at the handle H of the knife $K_1$ multiplied by a length $L_2$ from a point of application of the force $F_2$ to the crossbar 76 must be equal to a resistance force applied upwards by the food item against the blade $B_1$ of the knife $K_1$ multiplied by a distance $L_1$ from the pivot point 71 to the food item (equation 1). When the force $F_2$ multiplied by the length $L_2$ exceeds a magnitude of the food item's resistance force multiplied by the length $L_1$, the food items can no longer resist the action of the knife $K_1$ and must be cut. Thus, a magnitude of force $F_1$ applied by the knife $K_1$ against the food item is equal to the force $F_2$ applied by the user against the handle H of the knife $K_1$ multiplied by the ratio of $L_2$ divided by $L_1$ (equation 2).

$$F_1 L_1 = F_2 L_2 \quad \text{(equation 1)}$$

$$F_1 = F_2 (L_1/L_2) \quad \text{(equation 2)}$$

For instance, if $L_2$ is twice as long as $L_1$, the force $F_1$ which is applied against the food item is twice as great as the force $F_2$ actually applied by the user against the handle H. Similarly, if the length $L_2$ is four times greater than the length $L_1$, the force $F_1$ applied against the food item is four times greater than the force $F_2$ applied by the user at the handle H of the knife $K_1$. In this way, the user is supplied with a mechanical advantage in cutting the food item with the knife $K_1$. As exhibited in FIG. 5, multiple cuts can be performed on portions of a food item such as a carrot C which extend beyond the spikes 80. Also, cuts can be made to food items between the spikes 80.

Some food items, such as meats M, do not require excessive force to cut into smaller pieces. Rather, these food items can be sawed with an appropriate serrated knife $K_2$ with blade $B_2$. FIG. 6 reveals a method for cutting food items, such as meats M, utilizing the plate 10. Initially the meat M is placed on the top surface 20 with the spikes 80 piercing the meat M. Next, the user can saw the meat M into smaller pieces by moving the knife $K_2$ in a sawing motion, along arrow D. Throughout the operation, the spikes 80 keep the meat M stationary.

Once the food items have been divided into bite-sized morsels, or food items P, such as peas, are provided in bite-sized morsels, the food serving plate 10 can be utilized to load utensils for consumption. As shown in FIG. 7, the food items, such as peas P, are oriented proximate to the portion of the sidewall 50 including the overhang 60. A spoon S or other utensil is then slid along arrow A through the peas P or other food items in a scooping action and toward the overhang 60. The peas P are eventually trapped between the spoon S or other utensil and the overhang 60 and then the spoon S can be rotated so that the peas P are loaded upon the spoon S. The peas P or other food items can then be consumed.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A food preparation and serving plate for securely supporting food items thereon to assist in cutting the food items and loading the food items onto utensils for eating without the need of using two hands, the plate comprising in combination:

a substantially planar top surface, a plurality of spikes extending from said top surface, a fulcrum fixed to said top surface near said plurality of spikes with a space between a portion of said fulcrum and said top surface comprising means for providing leverage for a cutting implement and extending in a direction which crosses a periphery of the plate, and means to hold said fulcrum whereby food impaled by said plurality of spikes can be cut by the cutting implement working against said fulcrum.

2. The plate of claim 1 wherein said fulcrum includes a crossbar oriented parallel to said top surface.

3. The plate of claim 2 wherein said fulcrum is formed from rigid material and said crossbar of said fulcrum is substantially linear.

4. The plate of claim 3 wherein said means to hold said fulcrum includes two legs, a first of said two legs attached to a first end of said crossbar and to said top surface and a second of said two legs attached to a second opposite end of said crossbar and to said top surface, said legs oriented substantially perpendicular to said top surface.

5. The plate of claim 4 wherein said top surface is formed from a hard, smooth, non-porous material.

6. The plate of claim 5 wherein a sidewall surrounds a perimeter of said plate and extends up from said top surface.

7. The plate of claim 6 wherein said sidewall includes an overhang at a portion of said sidewall, said overhang having an inside surface which exhibits an angle which diverges more than 90° from said planar top surface and overlies said top surface.

8. The plate of claim 7 wherein said spikes are oriented substantially perpendicular to said planar top surface, said spikes having a sharpened tip at ends thereof distant from said top surface.

9. The plate of claim 8 wherein said spikes are oriented in rows extending substantially perpendicularly with respect to said crossbar.

10. The plate of claim 9 wherein said plate includes a bottom surface provided parallel to and beneath said top surface, said bottom surface including means to resist slippage of said plate upon an underlying support.

11. A food preparation and serving plate for supporting food items during cutting and other manipulation thereof by a disabled user, comprising in combination:

a planar top surface having a perimeter, a sidewall extending up from said perimeter of said top surface, a fulcrum located on said top surface having a portion comprising means for providing leverage for a cutting implement extending in a direction which crosses a periphery of the plate and spaced above said top surface, at least one spike extending perpendicularly up from said top surface strategically proximate said fulcrum, said spike including a sharpened tip at an end of said spike distant from said top surface, and a means to resist slippage of said plate upon an underlying support whereby one hand can be used to cut food on the plate by impaling the food on the spike and working a cutting implement against said fulcrum adjacent said spike.

12. The plate of claim 11 wherein said slippage resistance means is a layer of plasticized polyvinyl chloride comprised of between about 15 and 45 percent polyvinyl chloride and between about 55 and 85 percent plasticizer.

13. The plate of claim 12 wherein said fulcrum includes a crossbar and means to attach to said top surface, said crossbar oriented parallel to said top surface.

14. The plate of claim 13 wherein a planar bottom surface is oriented parallel to and beneath said top surface, said bottom surface including means to removably attach to said slippage resistance means.

15. A food preparation and serving plate for supporting food items during cutting and other manipulation thereof by a disabled user, comprising in combination:

a planar top surface having a perimeter, a sidewall extending up from said perimeter of said top surface, at least one spike extending perpendicularly up from said top surface, said spike including a sharpened tip at an end of said spike distant from said top surface, and a means to resist slippage of said plate upon an underlying support, wherein said slippage resistance means is a layer of plasticized polyvinyl chloride comprised of between about 15 and 45 percent polyvinyl chloride and between about 55 and 85 percent plasticizer, wherein a fulcrum including a crossbar is provided spaced above said top surface, said fulcrum including means to attach to said top surface, said crossbar oriented parallel to said top surface, and wherein a planar bottom surface is oriented parallel to and beneath said top surface, said bottom surface including means to removably attach to said slippage resistance means.

16. The plate of claim 15 wherein said sidewall includes an overhang on a portion of said sidewall, said overhang including an inside surface which gradually transitions from having an angle equal to an angle of said planar top surface adjacent a perimeter of said planar top surface, through an angle substantially perpendicular to said top surface, to having an angle which is greater than 90° from an angle of said planar top surface at a lip of said overhang.

17. The plate of claim 16 wherein said means to attach said fulcrum to said top surface is two legs, a first leg oriented perpendicular to said top surface and attached between said top surface and a first end of said crossbar at a location spaced from said sidewall, and a second leg oriented perpendicular to said top surface and attached between said top surface and to a second end of said crossbar opposite said first end of said crossbar at a location spaced from said sidewall, said legs extending substantially linearly and said crossbar extending substantially linearly, such that said fulcrum provides a substantially inverted U-shaped construct attached to said planar top surface with said crossbar parallel to and spaced from said top surface.

18. A food preparation and serving plate for supporting food items during cutting and other manipulation thereof by a disabled user, comprising in combination:

a planar top surface having a perimeter including a fulcrum positioned on said top surface, said fulcrum having a portion comprising mean for providing leverage for a cutting implement extending in a direction which crosses a periphery of the plate and spaced above said top surface, a sidewall extending up from said perimeter of said top surface, at least one spike extending perpendicularly up from said top surface, said spike including a sharpened tip at an end of said spike distant from said top surface, and a means to resist slippage of said plate upon an underlying support, wherein a planar bottom surface is oriented parallel to and beneath said top surface, said bottom surface having means to removably attach said bottom surface to said slippage resistance means.

* * * * *